US012624917B1

(12) United States Patent (10) Patent No.: US 12,624,917 B1

Huang (45) Date of Patent: May 12, 2026

(54) HYBRID STABILIZER ROD

(71) Applicant: Dorge O. Huang, Henry, IL (US)

(72) Inventor: Dorge O. Huang, Henry, IL (US)

( * ) Notice: Subject to any disclaimer, the term of this patent is extended or adjusted under 35 U.S.C. 154(b) by 204 days.

(21) Appl. No.: 18/664,468

(22) Filed: May 15, 2024

(51) Int. Cl.

| *F41B 5/14* | (2006.01) |
| *B32B 1/08* | (2006.01) |
| *B32B 5/12* | (2006.01) |
| *B32B 5/26* | (2006.01) |
| *B32B 15/14* | (2006.01) |
| *B32B 15/20* | (2006.01) |

(52) U.S. Cl.

CPC .............. *F41B 5/1426* (2013.01); *B32B 1/08* (2013.01); *B32B 5/12* (2013.01); *B32B 5/26* (2013.01); *B32B 15/14* (2013.01); *B32B 15/20* (2013.01); *B32B 2262/106* (2013.01)

(58) Field of Classification Search

CPC ...... F41B 5/1426; F41B 5/1442; F41B 5/148; B32B 1/08; B32B 5/12; B32B 5/26; B32B 15/14; B32B 15/20; B32B 2262/106

USPC ...................................... 124/89, 88

See application file for complete search history.

(56) References Cited

U.S. PATENT DOCUMENTS

| 8,839,776 B2 * | 9/2014 | Kingsbury ............ F41B 5/1426 |
| | | 124/1 |
| 10,145,643 B1 * | 12/2018 | Huang ................... F41B 5/1403 |
| 11,326,861 B1 * | 5/2022 | Song ........................ B32B 27/12 |
| 2008/0058133 A1 * | 3/2008 | Eastman ................... F42B 6/04 |
| | | 473/578 |
| 2012/0240913 A1 * | 9/2012 | Stokes .................. F41B 5/1426 |
| | | 124/89 |
| 2016/0161227 A1 * | 6/2016 | Connolly ................ F42B 35/02 |
| | | 473/578 |
| 2016/0195356 A1 * | 7/2016 | Roady ........................ F41B 5/14 |
| | | 124/87 |
| 2019/0346230 A1 * | 11/2019 | Summers .............. F41B 5/1426 |
| 2021/0270583 A1 * | 9/2021 | Gordon ..................... F42B 6/04 |

\* cited by examiner

*Primary Examiner* — John E Simms, Jr.

(74) *Attorney, Agent, or Firm* — Donald J. Ersler

(57) ABSTRACT

A hybrid stabilizer rod preferably includes a stabilizer tube, a first end cap and a second end cap. The stabilizer tube preferably includes a base tube, a first carbon fiber sheet and a second carbon fiber sheet. The first carbon fiber sheet includes a plurality of parallel fibers. The second carbon fiber sheet includes a plurality of first and second fibers. The first carbon fiber sheet is wrapped around the base tube. The second carbon fiber sheet is wrapped around the first carbon fiber sheet. The first and second end caps preferably include a thin head formed on a first end of a cap body and a tapered bore formed in a second end of the cap body. A threaded tap is formed in the first end of the cap body. An outer perimeter of cap body is sized to be received by an inner perimeter of the base tube.

14 Claims, 3 Drawing Sheets

HYBRID STABILIZER ROD

BACKGROUND OF THE INVENTION

1. Field of the Invention

The present invention relates generally to archery and more specifically to a hybrid stabilizer rod, which uses two different materials to provide a stabilizer rod with optimal performance.

2. Discussion of the Prior Art

Stabilizer rods for archery bows are usually fabricated from only one material, such as carbon fiber, aluminum, or titanium. Using carbon fiber for a stabilizer rod provides a very rigid stabilizer rod. However, a carbon fiber stabilizer has the drawback of transmitting an unpleasant amount of vibration, when an archery bow is fired and can cause shoulder inside joint pain after use. Some metals, due to their vibration-damping properties, only permit a minimal amount of vibration when the archery bow is fired, which is the opposite of carbon fiber, which nearly allows all vibration energy to be transmitted. However, the field experiments have proven that a titanium or other metal stabilizer rod can only be about two feet long, because it is less rigid than carbon fiber. The metal stabilizer rod will take too long to stabilize when an archer raises the bow to aim an arrow.

If more metal material is added to gain rigidity, the stabilizer rod will become too heavy to be used effectively. It appears that the prior art does not teach or suggest an archery stabilizer rod, which is made from a combination of titanium and carbon fiber. U.S. Pat. No. 10,145,643 to Huang (Huang) discloses a composite tube for an archery bow limb or arrow shaft. However, Huang does not include a metallic base tube.

Accordingly, there is a clearly felt need in the art for a hybrid stabilizer rod, which transmits a minimal amount of vibration when a bow is fired; does not require extra time when the bow is raised to a firing position; and provides a stable and fast aiming platform.

SUMMARY OF THE INVENTION

The present invention provides a hybrid stabilizer rod, which uses two different materials to provide an archery stabilizer rod with optimal performance. The hybrid stabilizer rod preferably includes a stabilizer tube, a first end cap, and a second end cap.

The stabilizer tube preferably includes a base tube, a first carbon fiber sheet, and a second carbon fiber sheet. The base tube is preferably fabricated from titanium, but other materials may also be used. The base tube preferably has a round cross section, but other cross-sectional shapes could also be used. However, at least one end cap could be replaced by spinning or forming a solid end on the at least one end of the base tube. A thread tap would be formed in the solid end, similar to the end cap. The first carbon fiber sheet includes a plurality of parallel fibers. The second carbon fiber sheet includes a plurality of first fibers in one direction and a plurality of second fibers formed perpendicular to the plurality of first fibers. The plurality of parallel fibers of the first carbon fiber sheet are wrapped around an outer perimeter of the base tube, preferably parallel to a center line of the base tube. It is preferable to wrap at least two layers of the first carbon fiber sheet around the base tube. The base tube and the first carbon fiber sheet are placed in an autoclave or the like to heat cure the first carbon fiber sheet to the base tube. An outer surface of the first carbon fiber sheet is machined to smooth-out the outer surface thereof. The second carbon fiber sheet is wrapped around the heat-cured first carbon fiber sheet, such that one of the first and second fibers is preferably parallel to a centerline of the base tube. It is preferable to wrap at least two layers of the second carbon fiber sheet around the machined first carbon fiber sheet. The base tube, the first carbon fiber sheet and the second carbon fiber sheet are placed in an autoclave or the like to heat cure the second carbon fiber sheet to the first carbon fiber sheet.

The first and second end caps preferably include a thin head formed on a first end and a tapered bore formed on a second end thereof. The first and second end caps are also preferably made from titanium, but other materials may also be used. A threaded tap is formed in the first end of thereof. An outer perimeter of the first and second end caps is sized to be received by an inner perimeter of the base tube. The first and second end caps are preferably retained in opposing ends of the base tube with a coating of slow-set epoxy or any other suitable bonding substance. The threaded taps on each end of the hybrid stabilizer rod allow thereof to hold a weight on one end with a threaded fastener and be threaded into a riser of a bow on an opposing end with a threaded stud.

Accordingly, it is an object of the present invention to provide a hybrid stabilizer rod, which transmits a minimal amount of vibration when a bow is fired, while enabling aiming time to be minimal, relative to a long titanium stabilizer of the same size and shape.

Finally, it is another object of the present invention to provide a hybrid stabilizer rod, which does not send back vibration shock from the bow after the shot is fired.

These and additional objects, advantages, features and benefits of the present invention will become apparent from the following specification.

DETAILED DESCRIPTION OF THE PREFERRED EMBODIMENTS

Figure 1:
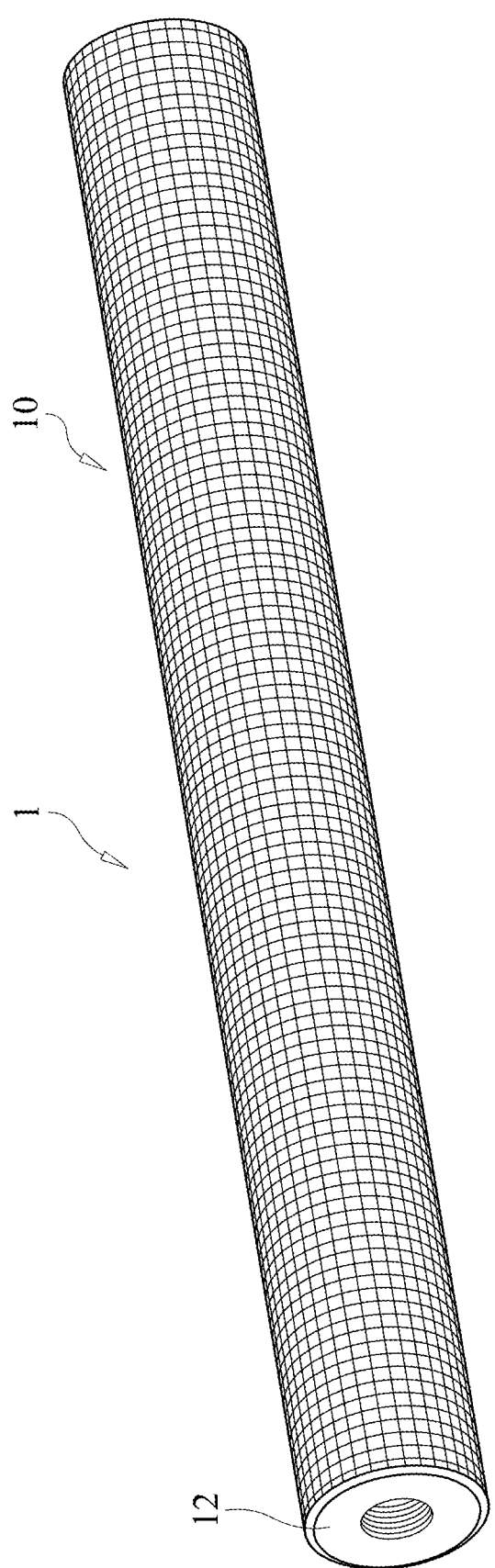
FIG. 1 is a perspective view of a hybrid stabilizer rod in accordance with the present invention.
Figure 2:
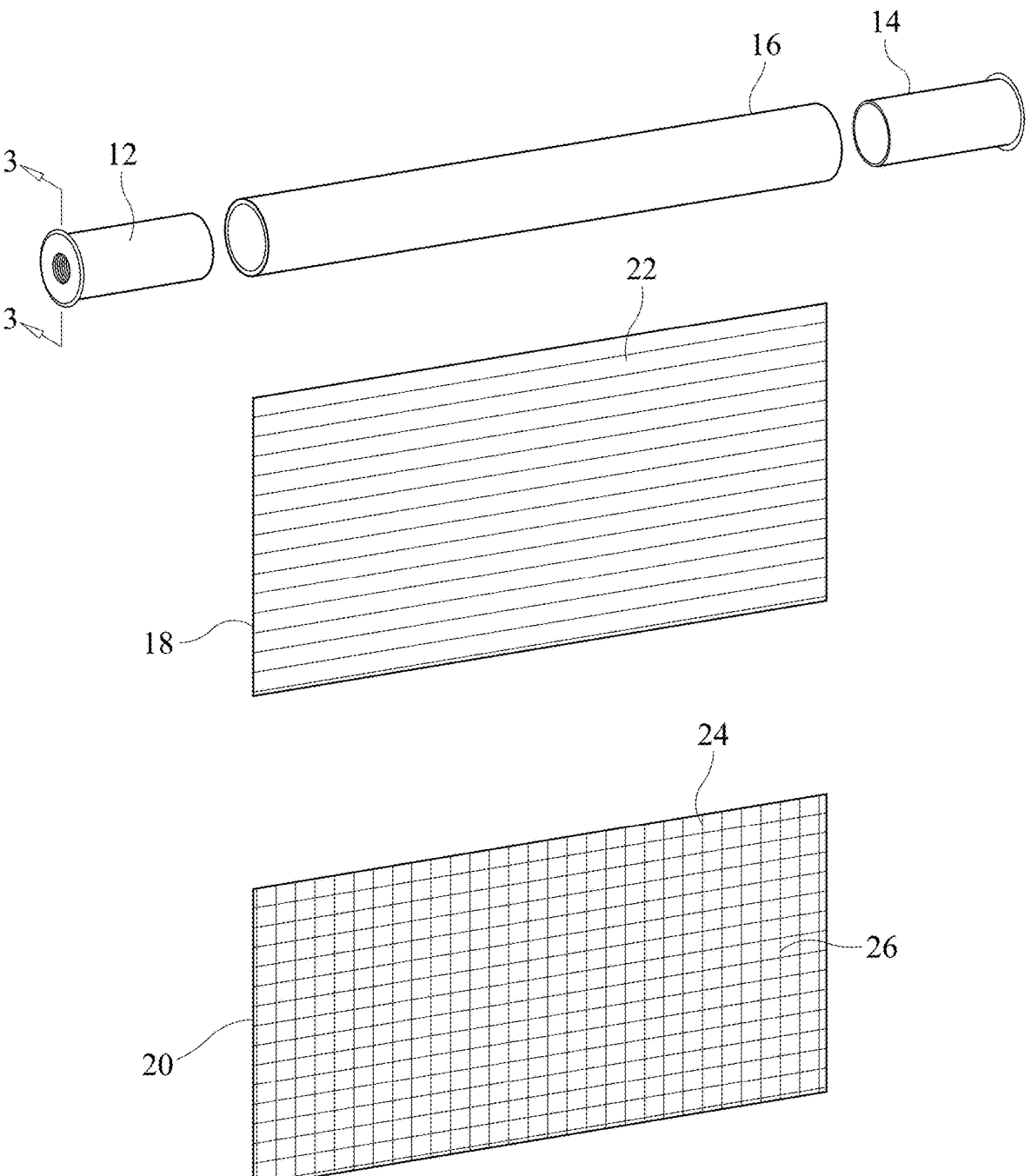
FIG. 2 is an exploded perspective view of a hybrid stabilizer rod in accordance with the present invention.

With reference now to the drawings, and particularly to FIG. 1, there is shown a perspective view of a hybrid stabilizer rod 1. With reference to FIG. 2, the hybrid stabilizer rod 1 preferably includes a stabilizer tube 10, a first end cap 12 and a second end cap 14. The stabilizer tube 10 preferably includes a base tube 16, a first carbon fiber sheet 18 and a second carbon fiber sheet 20. The base tube 16 is preferably fabricated from titanium, but other materials may also be used. The following parameters are given by way of example and not by way of limitation. Suitable grades of titanium include GR5, GR7 and GR9. A suitable wall thickness of the base tube 16 may range from 0.1 mm to 2 mm. The base tube 16 preferably has a round cross section, but other cross-sectional shapes may also be used. However, at least one end cap 12, 14 could be replaced by spinning or forming a solid end on the at least one end of the base tube 16. A threaded tap would be formed in the solid end, similar to the end cap 12, 14. The first carbon fiber sheet 18 includes a plurality of parallel fibers 22. The second carbon fiber sheet 20 includes a plurality of first fibers 24 in one direction and a plurality of second fibers 26 preferably formed perpendicular to the plurality of first fibers 24. The plurality of parallel fibers 22 of the first carbon fiber sheet 18 are wrapped around an outer perimeter of the base tube 16, preferably parallel to a center line of the base tube 16. It is preferable to wrap at least two layers of the first carbon fiber sheet 18 around the base tube 16. The base tube 16 and the first carbon fiber sheet 18 are placed in an autoclave or the like to heat cure the first carbon fiber sheet 18 to the base tube 16. An outer surface of the first carbon fiber sheet 18 is machined to smooth-out the outer surface thereof. The second carbon fiber sheet 20 is wrapped around the cured first carbon fiber sheet 18, after the first carbon fiber sheet 18 is machined. The second carbon fiber sheet 20 is wrapped around the first carbon fiber sheet 18, such that one of the first and second fibers 24, 26 is preferably parallel to a lengthwise centerline of the base tube 16. It is preferable to wrap at least two layers of the second carbon fiber sheet 20 around the machined first carbon fiber sheet 18. The base tube 16, the first carbon fiber sheet 18 and the second carbon fiber sheet 20 are placed in an autoclave or the like to heat cure the second carbon fiber sheet 20 to the first carbon fiber sheet 18.

Figure 3:
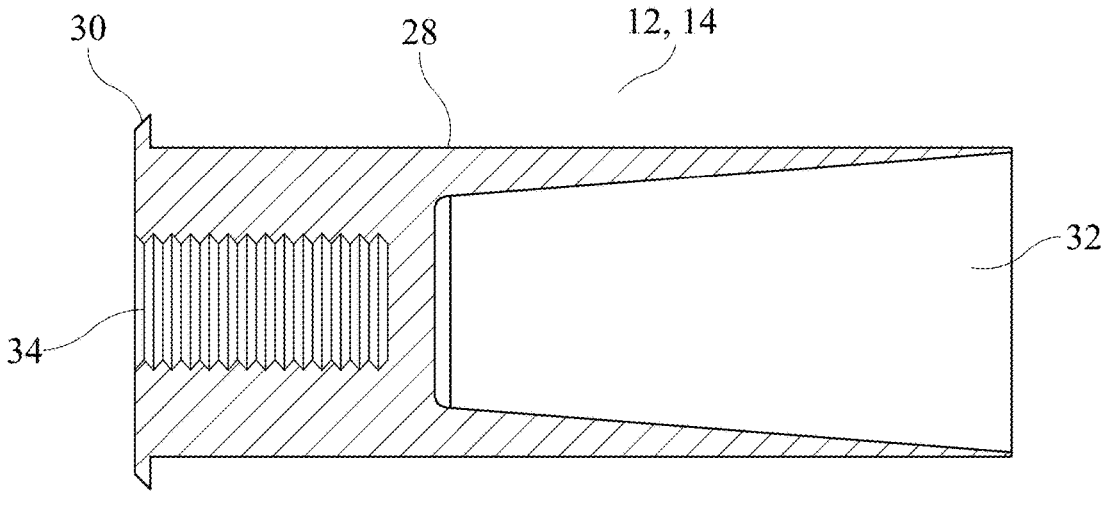
FIG. 3 is a cross section view cut through FIG. 2 of an end cap of a hybrid stabilizer rod in accordance with the present invention.
Figure 4:
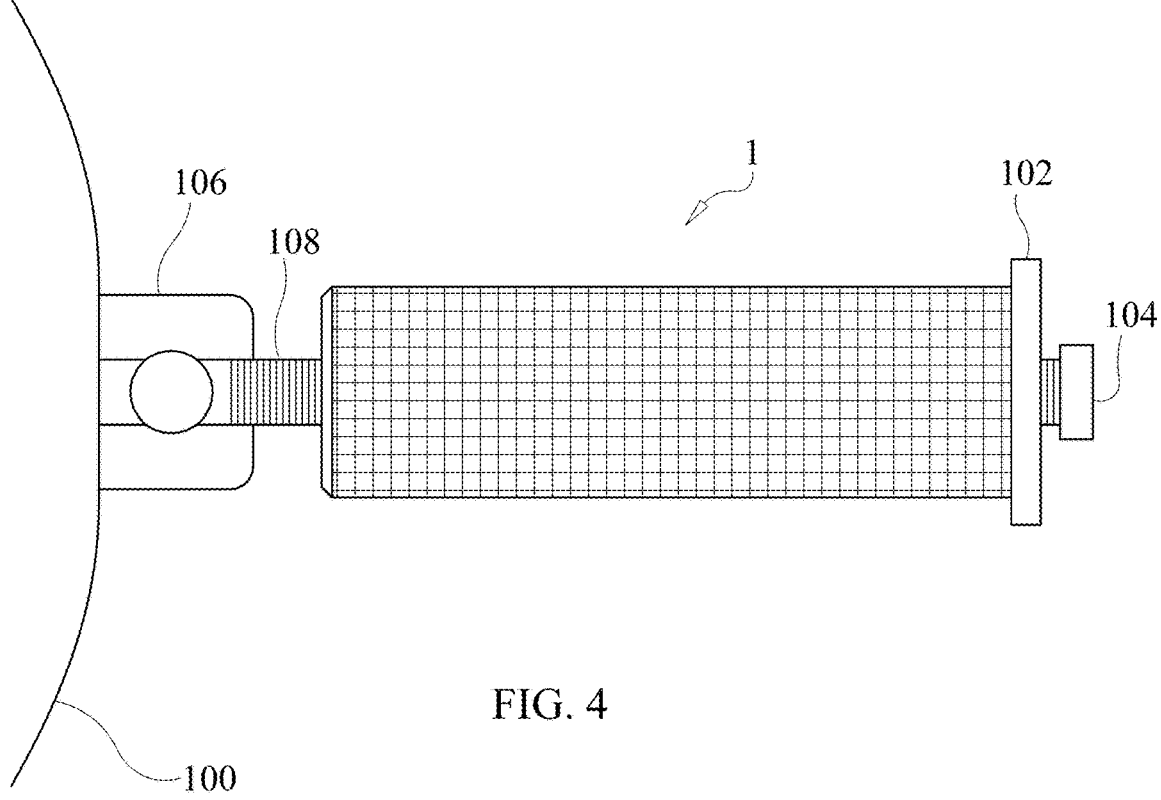
FIG. 4 is a side view of a hybrid stabilizer rod partially threaded on to a stud of a riser of an archery bow on one end, and a threaded fastener partially threaded into an opposing end of the hybrid stabilizer rod retaining a weight in accordance with the present invention.

With reference to FIG. 3, the first and second end caps 12, 14 preferably include a thin head 30 formed on a first end of a cap body 28 and a tapered bore 32 formed on a second end of the cap body 28. An outer perimeter of the thin head 30 is preferably equal to a final outer perimeter of the stabilizer tube 10. The first and second end caps 12, 14 are also preferably made from titanium. A threaded tap 34 is formed in the first end of the cylinder 28. An outer perimeter of the cap body 28 is sized to be received by an inner perimeter of the base tube 16. The first and second end caps 12, 14 are preferably retained in opposing ends of the base tube 16 with a coating of slow-set epoxy or any other suitable bonding substance. With reference to FIG. 4, the threaded taps 34 on each end of the hybrid stabilizer rod 1 allow thereof to hold a weight 102 on one end with a threaded fastener 104; and threaded into a threaded stud 108 of a quick release device 106. The quick release device 106 is attached to a riser 100 of an archery bow.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A hybrid stabilizer rod, comprising:
a base tube fabricated from a metallic material, said base tube resists transferring vibration;
at least one carbon fiber sheet is wrapped around an outer perimeter of said base tube, wherein said at least one carbon fiber sheet is secured to said base tube; and

a first end cap is retained in a first end of said base tube; and
a second end cap is retained in a second end of said base tube, said end caps each include a head formed on a first end and a tapered bore formed in a second end, a threaded tap is formed in said first end of said end caps.

2. The hybrid stabilizer rod of claim 1, wherein:
said at least one carbon fiber sheet includes a first carbon fiber sheet and a second carbon fiber sheet, said first carbon fiber sheet is secured to said base tube, said second carbon fiber sheet is secured to said first carbon fiber sheet.

3. The hybrid stabilizer rod of claim 2, wherein:
said first carbon fiber sheet includes a plurality of fibers, wherein said first carbon fiber sheet is wrapped around said base tube with said plurality of fibers parallel to a lengthwise centerline of said base tube.

4. The hybrid stabilizer rod of claim 3, wherein:
said first carbon fiber sheet is secured to said base tube by heating thereof.

5. The hybrid stabilizer rod of claim 2, wherein:
said second carbon fiber sheet includes a plurality of first fibers and a plurality of second fibers which are perpendicular to said plurality of first fibers, wherein one of said plurality of first fibers and said plurality of second fibers are parallel to a lengthwise centerline of said base tube.

6. The hybrid stabilizer rod of claim 5, wherein:
said second carbon fiber sheet is secured to said first carbon fiber sheet by heating thereof.

7. The hybrid stabilizer rod of claim 1, wherein:
said metallic material is titanium or aluminum.

8. A hybrid stabilizer rod, comprising:
a base tube fabricated from a metallic material, said base tube resists transferring vibration;
at least one carbon fiber sheet is wrapped around an outer perimeter of said base tube, wherein said at least one carbon fiber sheet is secured to said base tube; and
a first end cap is retained in a first end of said base tube; and
a second end cap is retained in a second end of said base tube, said end caps each include a head formed on a first end and a bore formed in a second end, a threaded tap is formed in said first end of said end caps.

9. The hybrid stabilizer rod of claim 8, wherein:
said at least one carbon fiber sheet includes a first carbon fiber sheet and a second carbon fiber sheet, said first carbon fiber sheet is secured to said base tube, said second carbon fiber sheet is secured to said first carbon fiber sheet.

10. The hybrid stabilizer rod of claim 9, wherein:
said first carbon fiber sheet includes a plurality of fibers, wherein said first carbon fiber sheet is wrapped around said base tube with said plurality of fibers parallel to a lengthwise centerline of said base tube.

11. The hybrid stabilizer rod of claim 10, wherein:
said first carbon fiber sheet is secured to said base tube by heating thereof.

12. The hybrid stabilizer rod of claim 9, wherein:
said second carbon fiber sheet includes a plurality of first fibers and a plurality of second fibers which are perpendicular to said plurality of first fibers, wherein one of said plurality of first fibers and said plurality of second fibers are parallel to a lengthwise centerline of said base tube.

13. The hybrid stabilizer rod of claim 12, wherein:

said second carbon fiber sheet is secured to said first
  carbon fiber sheet by heating thereof.

14. The hybrid stabilizer rod of claim 8, wherein:

said metallic material is titanium or aluminum.

\* \* \* \* \*